Feb. 25, 1964  A. L. LEE ETAL  3,122,373
HIGH PRESSURE FLUID SEALS
Filed July 11, 1960  3 Sheets-Sheet 1
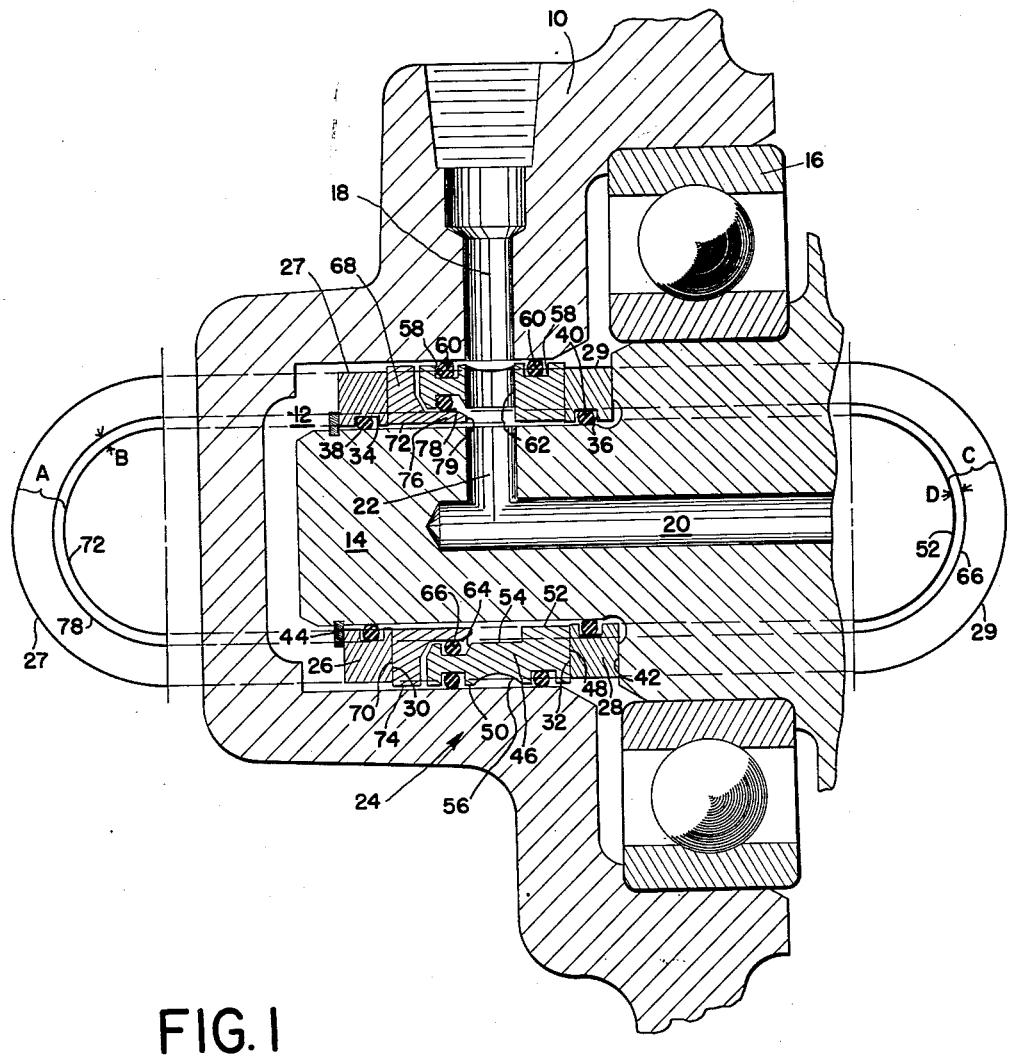
FIG. 1
INVENTORS
ARTHUR L. LEE
ARTHUR B. COVAL
BY
their ATTORNEY INVENTORS
ARTHUR L. LEE
ARTHUR B. COVAL
their ATTORNEY

INVENTORS
ARTHUR L. LEE
ARTHUR B. COVAL

United States Patent Office 3,122,373
Patented Feb. 25, 1964

3,122,373
HIGH PRESSURE FLUID SEALS
Arthur L. Lee and Arthur B. Coval, Columbus, Ohio, assignors to Consolidation Coal Company, Pittsburgh, Pa., a corporation of Pennsylvania
Filed July 11, 1960, Ser. No. 41,937
6 Claims. (Cl. 277—3)

The present invention relates to fluid seals and more particularly to a pressure actuated, running seal to prevent leakage of fluid between two relatively rotating members.

Running fluid seals present problems of extreme wear and disintegration at high fluid pressures and high rotating speeds. By "running seal" is meant a seal between two relatively movable members as opposed to a static seal where the two bodies between which a seal is created have negligible movement relative to each other. It is well recognized in the seal art that static seals do not present the problems of extreme wear under high pressure that are inherent in running seals. Static seals may be utilized at extremely high pressures since the very small magnitude of the movement between the parts being sealed and the low velocity of the relative movement between parts being sealed does not present problems of wear or disintegration to static seals. Running seals, on the other hand, have been hitherto limited to relatively low pressures and operating speeds for prolonged running seal life.

The seals of the present invention may be utilized to seal high pressure fluid and are designed to be utilized at high shaft rotating speeds. The seals of the present invention are wear resistant and durable. This invention also provides a novel telescoped-piston fluid actuated seal which has two relatively movable pistons that serve to relieve the forces on the running surfaces of the seals to thereby prolong their life and reduce wear and friction on the seal elements.

The present invention may be utilized as a shaft seal to provide a running seal between a rotating shaft and a fixed housing member. A shaft seal should be radially compact, have low friction properties, and, at the same time, be easily assembled and installed on the shaft. The shaft seal should not require extensive modification of the shaft for installation of the seal. Particularly, the shaft seal should not require undercutting of the shaft since undercuts materially weaken the overall shaft and require larger shafts for a particular purpose. The present invention provides shaft seals which require very minor modification to the shafts for installation of the seals. In the following detailed description, the seals of the present invention will be described as shaft seals adapted to permit fluid communication between a fluid passage within a fixed housing member and a fluid passage within a rotating shaft member so that fluid under pressure may continually pass from one passage to the other without leakage around the outer portion of the shaft. While the housing will be referred to as the fixed housing and the shaft will be referred to as a rotating shaft throughout this specification, it is within the scope of the present invention to have a rotatable outer housing member and a fixed shaft member.

With the foregoing considerations in mind, it is a primary object of the present invention to provide an improved pressure actuated running fluid seal.

Another object of this invention is to provide a running seal which has long life under high pressure and high speed conditions.

Another object of this invention is to provide a pressure actuated running seal that has a telescoped-piston arrangement to relieve the forces on the running surfaces of the seal.

Another object of this invention is to provide a running seal that is radially compact and easily assembled and installed on a shaft.

Another object of this invention is to provide a shaft seal that does not require extensive, weakening modifications to the shaft for installation of the seal.

These and other objectives achieved by this invention will become apparent as this description proceeds in connection with the accompanying drawings.

In the drawings:

FIGURE 1 is a sectional view of a high pressure running seal built in accordance with the principles of the present invention.

Figure 2:
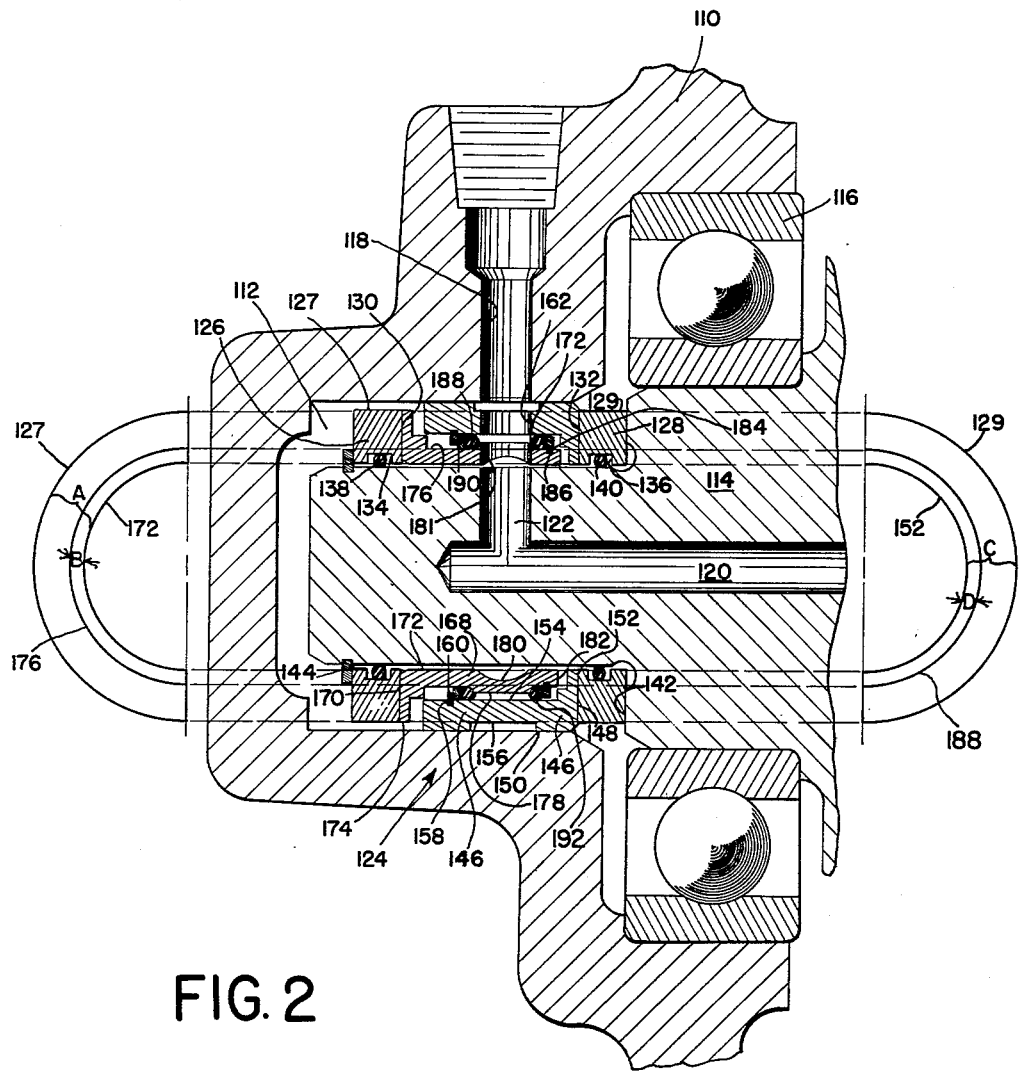
FIGURE 2 is a sectional view of another embodiment of a high pressure running seal built according to the present invention.

Referring to the drawings, and particularly to FIGURE 1, a seal having a novel telescoped-piston arrangement to relieve the forces on the running surfaces of the seal is shown in section. It has been determined that running seals formed entirely from metal components have a very substantial life when the forces per unit area urging the running surfaces together are approximately 250 pounds per square inch of sealing surface contact or less. Once the forces urging the running surfaces together are greater than 250 pounds per square inch, undo wear occurs in the seal and the life of the running seal is shortened to the extent that such seals are economically prohibitive. While the seal components of running seals may be formed from material other than metal to inhibit extreme wear, metal seal rings have advantages in that they are cheaper, easier to form, and are more able to withstand severe shocks and loads. The seal shown in FIGURE 1 is designed to be actuated by fluid pressure. The novel telescoped-piston arrangement of the seal elements relieves the pressure on the relatively movable running surfaces of the seal so that these forces are substantially less than the fluid pressure which actuates the seal.

In FIGURE 1 there is shown a housing 10 having a cylindrical chamber 12 formed therein. A shaft 14 is rotatably supported by bearing assembly 16 within housing 10 in coaxial relation to the cylindrical chamber 12. Housing 10 has formed therein a fluid passage 18 which communicates with chamber 12. Coaxially formed in shaft 14 is a fluid passage 20 which has a radially extending portion 22 that communicates with the external surface of shaft 14. A seal assembly 24 is provided to permit fluid communication between fluid passage 18 in fixed housing 10 and fluid passage 20 in rotating shaft 14 without permitting leakage along the surface of shaft 14. The seal assembly 24 includes a pair of shaft sealing surface members 26 and 28 which are identical in construction. Sealing surface member 26 has a cylindrical external surface 27, and sealing surface member 28 has a cylindrical external surface 29. Sealing surface member 26 has a polished planar surface 30 formed on one end thereof. The shaft sealing surface member 28 has a polished planar surface 32 formed on one end thereof.

The sealing surface member 26 has an annular groove 34 formed in its cylindrical internal surface. The sealing surface member 28 has an annular groove 36 formed in its cylindrical internal surface. An O-ring 38 is disposed within annular groove 34 in sealing surface member 26 and serves to sealingly engage the sealing surface member 26 to shaft 14. An O-ring 40 in annular groove 36 formed in sealing surface member 28 serves to sealingly engage the member 28 to shaft 14. The O-rings 38 and 40 provide static seal means between the respective members 26 and 28 and the shaft 14. In addition to providing static seal means, which are able to withstand extremely high pressures, the O-rings 38 and 40 serve to frictionally engage the respective members 26 and 28 to shaft 14 so that the members 26 and 28 are nonrotatable relative to shaft 14 under normal seal operating conditions.

The sealing surface members 26 and 28 are disposed upon shaft 14 with their respective polished planar surfaces 30 and 32 disposed to face each other. The members 26 and 28 are disposed in axially spaced relation to each other. A shoulder 42 on shaft 14 serves as a stop means to prevent axial movement of member 28 away from member 26. A snap ring 44 disposed within a groove in shaft 14 serves as a stop means to prevent axial movement of member 26 away from member 28. The shoulder 42 and snap ring 44 are exemplary only and any suitable axial stop means may be provided to limit axial movement of the two sealing surface members 26 and 28 away from each other.

Disposed within the cylindrical chamber 12 of housing 10 between the sealing surface members 26 and 28 is an outer annular piston 46 which surrounds shaft 14. Piston 46 has a radially extending planar polished sealing surface 48 formed on one end thereof. The piston 46 has a generally cylindrical external surface 50 and a cylindrical internal surface 52. Cylindrical internal surface 52 fits freely over shaft 14. An undercut portion 54 of the cylindrical internal surface 52 provides a portion of increased internal diameter on piston 46. The cylindrical external surface 50 of piston 46 has an annular recess 56 formed therein and extending about the periphery of piston 46. The piston 46 is so proportioned that when the sealing surface 48 of piston 46 is in abutting relation with the polished planar surface 32 of sealing surface member 28, the annular recess 56 in the cylindrical surface 50 of piston 46 is in axial alignment with the passage 18 formed in housing 10. In this manner, fluid from housing 10 flows around the periphery of piston 46 in annular recess 56. Piston 46 has a pair of annular grooves 58 formed in its external cylindrical surface 50. An O-ring 60 is disposed in each of the grooves 58 to provide a static seal between the piston 46 and the internal surface of cylidrical chamber 12 formed in housing 10. The O-rings 60 are located axially at either end of piston 46 so that fluid entering the annular recess 56 from passage 18 is confined between the O-rings 60 at the points where the O-rings sealingly contact the internal surface of chamber 12. In addition to providing static seal means for the piston 46, O-rings 60 frictionally engage the piston 46 to the wall of housing chamber 12 so that the piston 46 is nonrotatable relative to housing 10 under normal seal operating conditions.

The piston 46 has a plurality of radial passages 62 formed therein to permit fluid communication from annular recess 56 on cylindrical surface 50 to the undercut portion 54 of cylindrical internal surface 52 of piston 46. The undercut portion 54 of cylindrical internal surface 52 has an annular groove 64 formed therein to receive an O-ring 66. O-ring 66 serves to seal and frictionally engage the outer annular piston 46 to an inner annular piston 68 in a manner to be described.

An inner annular piston 68 is disposed within cylindrical chamber 12 of housing 10 between the sealing surface members 26 and 28. The inner annular piston 68 has a radially extending planar polished sealing surface 70 formed on one end thereof. The piston 68 has a cylindrical internal surface 72 and a cylindrical external surface 74. An axially extending flanged portion 76 is formed on piston 68 and disposed to extend coaxially into the outer piston 46. Flanged portion 76 has a cylindrical external surface 78 and an end wall 79.

The O-ring 66 disposed within the annular groove 64 formed in the undercut portion 54 of piston 46 cooperates with the cylindrical external surface 78 of flanged portion 76 formed on inner annular piston 68 to provide static seal means between the outer piston 46 and the inner piston 68. The O-ring 66 also serves to frictionally engage the inner piston 68 to the outer piston 46 so that inner piston 68 is nonrotatable relative to outer piston 46 under normal seal operating conditions.

Fluid under pressure entering passage 18 and passing through radial passages 62 formed in piston 46 enters into the radially extending portion 22 of passage 20 formed in shaft 14. O-ring 66 prevents fluid from passing out between the respective pistons 46 and 68. The pistons are telescoped with the outer piston 46 over the flanged portion of the inner piston 68. Since the internal surface 52 of piston 46 and the internal cylindrical surface 72 of piston 68 are each substantially larger in diameter than the cylindrical surface of shaft 14, fluid may pass axially between the respective pistons and shaft 14 to the sealing surface members 26 and 28 respectively. The O-rings 38 and 40 prevent passage of fluid axially along shaft 14 beyond the sealing surface members 26 and 28. When fluid under pressure is admitted through passage 18 in housing 10, the pistons 46 and 68 are urged axially away from each other and into an abutting relation with the sealing surface members 28 and 26 respectively. Thus, the polished planar surface 48 of piston 46 is in abutting relation with the polished planar surface 32 of sealing surface member 28 and the polished planar surface 70 of piston 68 is in abutting relation with the polished planar surface 30 of sealing surface member 26.

The abutting faces of the annular pistons 46 and 68 and the respective sealing surface members 28 and 26 provide the relatively movable running surfaces for the seal. Since the pistons 46 and 68 are nonrotatable relative to housing 10 and the sealing surface members 26 and 28 are nonrotatable relative to shaft 14, the polished planar surfaces of these members move relative to each other as the shaft 14 rotates within housing 10 to provide the running seal.

A small amount of fluid leakage occurs between the running polished surfaces of the seal elements to provide lubrication of the seal elements. Fluid entering passage 18 is conducted to passage 20 in shaft 14 as described. A small amount of the fluid passes along the shaft 14 between shaft 14 and the internal surface 72 of piston 68 and the internal surface 52 of piston 46. This small amount of fluid passes radially outwardly between the polished planar sealing surfaces 32 and 48 and between the polished planar sealing surfaces 30 and 70 respectively and lubricates these relatively movable surfaces.

The novel telescoping construction of the pistons 46 and 68 provides a fluid actuated seal but insures that the forces urging the running sealing surfaces 48 and 32 and urging the running sealing surfaces 30 and 70 toward each other are less per unit area of contact of the surfaces than the pressure of the fluid actuating the seal. When fluid enters passage 18 in housing 10 and is conducted between O-rings 60 which seal the piston 46 to housing 10, the radial passages 62 in piston 46 are filled with fluid and fluid fills that portion of the chamber 12 between O-rings 60 which seal the piston 46 to housing 10 and O-rings 38 and 40 respectively which seal the sealing surface members 26 and 28 respectively to the shaft 14.

Considering first the inner annular piston 68, it will be seen that the polished planar surface 70 of piston 68 contacts the polished planar surface 30 of sealing surface member 26 through an annular area of contact which has an inner circumference equal to the circumference of the internal cylindrical surface 72 of piston 68 and which has an outer annular circumference equal to the circumference of the external cylindrical surface 27 of the sealing surface member 26. One-half of this area has been projected at the left side of FIGURE 1 and is labeled area A.

The piston 68 is urged into contact with sealing surface member 26 by fluid pressure acting upon the piston. The fluid pressure is conducted from passage 18 into the shaft passage 20. The portion of the piston 68 exposed to this fluid pressure is the end wall 79 of flange portion 76 of the piston 68. The force urging the piston 68 into contact with the surface sealing member 26 is equal to the pressure of the fluid entering passage 18 in the housing 10, multiplied by the surface area on piston 68 exposed to this fluid as projected on a plane normal to the axis of shaft 14. In other words, the force urging piston 68 into contact with member 26 is equal to the fluid pressure multiplied by annular area having an inner circumference equal to the circumference of the internal cylindrical surface 72 of piston 68 and an outer circumference equal to the circumference of external cylindrical surface 78 of flanged portion 76 of piston 46. One-half of this annular area is projected at the left of FIGURE 1 and is labeled B.

Because of the difference of these two areas A and B, it will be seen that:

The force per unit area of surface contact urging the running seal surfaces together $$= \frac{(\text{pressure of fluid entering passage 18}) \times (\text{area B})}{\text{area A}}$$

In a like manner, the piston 46 will be urged into axial contact with the sealing surface member 28 by fluid under pressure from passage 18. Since pressurized fluid fills the chamber 12 between O-rings 60 and O-rings 38 and 40, the fluid pressure will act on piston 46 only to the extent that piston 46 has a net unbalanced area exposed to the fluid. It may be seen that fluid entering passages 62 in piston 46 will not urge the piston 46 in either direction since it will act in all directions on the walls of the passages 62. All of the piston 46 radially outwardly of the point where O-ring 66 sealingly contacts the flange cylindrical surface 78 of inner piston 68 will be completely balanced so that no net unbalanced area will be exposed to the fluid pressure to urge the piston 46 into contact with sealing surface member 28. However, radially inwardly of the O-ring 66, the fluid entering passage 18 will act upon the piston 46 and urge it axially toward the sealing surface member 28.

The polished planar surface 48 of piston 46 will contact the polished planar surface 32 of sealing surface member 28 throughout an annular area having an inner circumference equal to the circumference of the internal cylindrical surface 52 of piston 46 and having an outer circumference equal to the circumference of cylindrical external surface 29 of sealing surface member 28. One-half of this area is projected to the right of FIGURE 1 and is labeled C. The force with which the piston 46 is urged into contact with the sealing surface member 28 will be equal to the pressure of the fluid entering through passage 18 multiplied by the net unbalanced area of the piston 46 exposed to that fluid as projected on a plane normal to the axis of shaft 14. This net unbalanced area projected on a plane normal to shaft 14 is equal to an annular area having an inner circumference equal to the circumference of cylindrical internal surface 52 of piston 46 and an outer circumference equal to the circumference of the circle of sealing contact between the inner diameter of O-ring 66 and the cylindrical flange surface 78 of inner annular piston 68. One-half of this area is shown projected at the right side of FIGURE 1 and is labeled B. From the foregoing discussion it can be seen that:

The force per unit area of surface contact urging the running seal surfaces together $$= \frac{(\text{pressure of fluid entering passage 18}) \times (\text{area D})}{\text{area C}}$$

In a high pressure seal it is desirable to have the force per unit area of contact with which the running sealing surfaces are urged together substantially less than the pressure of the fluid being sealed. From the foregoing description, it can be seen that this is accomplished by the seal of FIGURE 1. As an example, consider fluid at a 1000 p.s.i. being conducted through passage 18. If the seal elements are so proportioned that the area of contact between piston 68 and sealing surface member 26, or area A, is four times as great as the net unbalanced area of piston 68 exposed to the fluid pressure, or area B, and if the area of contact between piston 46 and surface sealing member 28, or area C, is four times as great as the net unbalanced area of piston 46 exposed to the fluid pressure from passage 18, or area D, then, from the equations given above, the force per unit area of surface contact urging the sealing surfaces toward each other will be 250 p.s.i. It will be noted that the relative proportions of the areas of contact and the net exposed areas of the respective pistons can be varied to vary the forces urging the running sealing surfaces toward each other for various pressures and operating conditions. Further, it will be noted that the areas on each component of the seal need not be the same. That is, the sizes of piston 68 and surface sealing member 26 can be arranged so that these two relatively movable members bearing sealing surfaces are urged into contact more forcefully than are the piston 46 and sealing surface member 28 if so desired.

FIGURE 2 shows a second embodiment of a high pressure running fluid seal having telescoping pistons which are arranged to urge the seal running surfaces into contact with each other. In FIGURE 2, the annular pistons are preassembled and connected to each other prior to their assembly within the seal. The operation of the seal of FIGURE 2 is generally similar to FIGURE 1.

In FIGURE 2, a housing 110 has a cylindrical chamber 112 formed therein. A shaft 114 is rotatably supported within housing 110 in coaxial relation to cylindrical chamber 112 by bearing assembly 116. A fluid passage 118 in housing 110 communicates with cylindrical chamber 112. A fluid passage 120 is formed in shaft 114 and passage 120 has a radially extending portion 122 which communicates with the surface of shaft 114 within cylindrical chamber 112. A seal assembly 124 is provided to permit passage of fluid from the passage 118 in housing 110 to passage 120 in rotating shaft 114. This seal prevents leakage of fluid along the shaft 114.

A pair of annular shaft sealing surface members 126 and 128 having external cylindrical surfaces 127 and 129 respectively are disposed in axially spaced relation on shaft 114 within cylindrical chamber 112. Sealing surface member 126 has a polished planar sealing surface 130 formed thereon. Annular shaft sealing surface member 128 has a polished planar sealing surface 132 formed thereon. When sealing surface members 126 and 128 are in position on shaft 114, the polished planar surfaces 130 and 132 respectively are disposed to face each other. The sealing surface member 126 has an annular groove 134 formed in its internal cylindrical surface. The sealing surface member 128 has an annular groove 136 formed in its internal cylindrical surface. O-rings 138 and 140 respectively are disposed within grooves 134 and 136 to sealingly and frictionally engage the respective sealing surface members 126 and 128 to shaft 114. The O-rings 138 and 140 are static seal means which are able to withstand very high fluid pressures and these O-rings 138 and 140 also serve to frictionally engage the sealing surface members 126 and 128 to the shaft 114 so that the sealing surface members 126 and 128 are rotatable with the shaft 114.

A shoulder 142 formed on shaft 114 prevents axial movement of sealing surface member 128 away from sealing surface member 126. A snap ring 144 disposed within a groove on shaft 114 serves as a stop means to prevent axial movement of sealing surface member 126 axially away from sealing surface member 128.

Disposed within cylindrical chamber 112 and axially between sealing surface members 126 and 128 is an outer annular piston 146 which surrounds shaft 114. The outer annular piston 146 has a radially extending planar polished surface 148 formed on one end thereof. The outer annular piston has a generally cylindrical external surface 150 and a cylindrical internal surface 152. The cylindrical internal surface 152 has an undercut portion 154 of greater diameter than the cylindrical internal surface 152. The cylindrical external surface 150 of piston 146 is of such size that it fits in static sealing relation with the cylindrical internal surface of the housing chamber 112. The piston 146, due to its external cylindrical size, also frictionally engages the wall of cylindrical chamber 112 so that piston 146 remains in nonrotatable relation relative to housing 110 under normal seal operating conditions.

The generally cylindrical external surface 150 of piston 146 has an annular recess 156 formed therein. The proportions of the seal elements are such that when the polished planar surface 148 of piston 146 is in abutting relation with the sealing surface member 128, the annular recess 156 in external cylindrical surface 150 of piston 146 is in axial alignment with passage 118 entering the cylindrical chamber 112. The undercut portion 154 of cylindrical internal surface 152 of piston 146 has an annular groove 158 formed therein. Annular groove 158 receives a snap ring 160 which serves as a stop member in a manner to be decribed. The piston 146 has a plurality of radial passages 162 formed therein communicating with the annular recess 156 and permitting passage of fluid from annular recess 156 to the undercut portion 154 of the internal cylindrical surface 152. The fluid entering passage 118 passes into recess 156 and through the radial passages 162.

An inner annular piston 168 is disposed within chamber 112 between the sealing surface members 126 and 128 and in telescoped relation with the outer annular piston 146. Inner annular piston 168 has a radially extending planar polished sealing surface 170 formed on one end thereof. The inner annular piston 168 has a cylindrical internal surface 172 and a cylindrical external surface 174. Cylindrical external surface 174 has an undercut portion 176 which extends axially through the undercut portion 154 of outer annular piston 146.

The undercut portion 176 of cylindrical external surface 174 has an annular protrusion 178 extending therearound. Annular protrusion 178 is positioned to be axially aligned with the radial passages 162 in outer annular piston 146 when the polished planar surface 170 of piston 168 is in abutting relation with the sealing surface member 126. An annular recess 180 is formed in the cylindrical internal surface 172 of the inner annular piston 168 in axial alignment with the annular protrusion 178 formed on the undercut portion 176. A plurality of radially extending passages 181 connect the external surface of protrusion 178 with the annular recess 180 formed in the internal cylindrical surface of piston 168. Radial passages 181 permit fluid from passage 118 that has passed through radial passages 162 formed in outer annular piston 146 to pass radially through the inner annular piston 168 and enter passage 122 formed in shaft 114. Passage 122 in shaft 114 is in fluid communication with the recess 180 formed in the inner annular piston 168. The inner annular piston 168 has a piston end face 182 at the end opposite polished planar surface 170. Undercut portion 176 of cylindrical external surface 174 of inner annular piston 168 has an annular groove 184 formed therein adjacent the end face 182. The snap ring 186 is disposed in groove 184 to serve as a stop member.

An O-ring 188 is disposed between the undercut portion 154 of outer annular piston 146 and the undercut portion 176 of inner annular piston 168 and is located axially between snap ring 160 secured to the outer annular piston 146 and the protrusion 178 formed on inner annular piston 168. O-ring 188 serves as a static seal means between the outer annular piston 146 and the inner annular piston 168. O-ring 188 also serves to frictionally engage the inner annular piston 168 to the outer annular piston 146 so that the pistons 146 and 168 are nonrotatable relative to each other and nonrotatable relative to the housing 110 under normal seal operating conditions. A rigid backing washer 190 is disposed between the O-ring 188 and the snap ring 160 to provide a rigid axial support for O-ring 188. A second O-ring 192 is disposed between the undercut portion 154 of outer annular piston 146 and undercut portion 176 of inner annular piston 168 and axially between the protrusion 178 on the inner annular piston 168 and the snap ring 184 secured to inner annular piston 168. O-ring 192 serves to frictionally engage the two pistons 146 and 168 to each other and to mechanically balance the two pistons 146 and 168 in coaxial relation to each other. O-ring 192 does not, however, serve a hydraulic sealing function since fluid is admitted to both sides of O-ring 192 as will be described.

Fluid is admitted into passage 118 under pressure and it passes into annular recess 156 formed in the external cylindrical surface of piston 146. The fluid is prevented from leaving recess 156 axially along the external cylindrical surface 150 of piston 146 because piston 146 is in static sealing relation to the housing 110. The fluid then passes radially through passages 162 into the undercut portion of outer piston 146. The fluid is prevented by O-ring 188 from passing axially between the piston 146 and the piston 168. The fluid does, however, pass radially through passages 181 in inner piston 146 into annular recess 180 formed in inner annular piston 168. The internal cylindrical surface 172 of piston 168 is of such size that fluid may pass freely axially along shaft 114 until it reaches the O-rings 138 and 140 which seal the respective sealing surface members 126 and 128 to shaft 114. The fluid also finds its way around the end face 182 of inner piston 168 and into the chamber behind snap ring 186 and O-ring 192. A very small amount of fluid leaks radially outwardly between the sealing surfaces 130 and 170 and between sealing surfaces 148 and 132 to lubricate these surfaces as previously described in connection with FIGURE 1.

The force urging the respective pistons 146 and 168 into contact with sealing surface members 128 and 126 respectively is less per unit area of sealing surface contact than the pressure entering passage 118 in this embodiment of the invention as well as the embodiment of FIGURE 1.

The polished planar surface 170 of piston 168 contacts the polished planar surface 130 of sealing surface member 126 throughout an annular area having an inner circumference equal to the circumference of internal cylindrical surface 172 of piston 168 and an outer circumference equal to the circumference of outer cylindrical surface 127 of sealing surface member 126. One-half of this area is projected to the left of FIGURE 2 and is labeled area A. The force with which the sealing surfaces 130 and 170 are urged into contact with each other is equal to the pressure of the fluid entering passage 118 multiplied by the net unbalanced area on inner annular piston 168 exposed to that pressure. This net unbalanced area is equal to the annular area projected on a plane normal to the shaft 114 having an inner circumference equal to the internal cylindrical surface 172 of piston 168 and having an outer circumference equal to the undercut portion 176 of inner annular piston 168. One-half of this area is projected to the left of FIGURE 2 and is labeled B. The equation previously presented to express a functional relation between areas A and B in connection with FIGURE 1 is also applicable to areas A and B in FIGURE 2.

The polished planar surface 148 of outer annular piston 146 contacts the polished planar surface 132 of sealing surface member 128 throughout an annular area having an inner circumference equal to the circumference of the inner cylindrical surface 152 of piston 146 and having an outer circumference equal to the circumference of cylindrical external surface 129 of sealing surface member 128. This area is projected to the right of FIGURE 2 and is labeled C. The polished planar surface 148 of piston 146 is urged into contact with polished planar surface 132 of sealing surface member 129 by a force equal to the net unbalanced area of the piston 146 exposed to fluid pressure from chamber 118 multiplied by the pressure of the fluid from chamber 118. This net unbalanced area is equal to an annular area having an inner circumference that is equal the circumference of internal cylindrical surface 152 of outer annular piston 146 and having an outer circumference equal to the circumference of the circle of sealing contact of O-ring 188 with the undercut portion 176 of inner annular piston 172. This area is projected to the right of FIGURE 2 and is labeled D. Because the backing washer 190 rigidly supports O-ring 188, O-ring 188 functions as an integral part of piston 146, and the net unbalanced area of piston 146 exposed to the pressurized fluid from passage 118 is that portion of the piston 146 radially inwardly of the point of sealing contact between the two telescoped pistons 146 and 168. The equation previously set forth for the functional relation of C and D with respect to FIGURE 1 is equally applicable to C and D of FIGURE 2.

As previously discussed in connection with FIGURE 1, the areas A, B, C and D may be varied to control the forces which urge the sealing surfaces of the seal 124 toward each other. They may also be varied to control the force per unit area of actual contact between the sealing surfaces.

The seal of FIGURE 2 is pre-assembled so that the two pistons 146 and 168 are mechanically interlocked to each other before assembly of the seal within chamber 112. This preassembly of pistons 146 and 168 is accomplished by starting with inner annular piston 168. The snap ring 160 is then loosely slipped over the undercut portion 176 of piston 168. The back up washer 190 is next slipped over the undercut portion 176. The O-ring 188 is then placed on the undercut portion 176. The O-ring 192 is then placed in position on undercut portion 176. The snap ring 186 is snapped into position in groove 184. The outer annular piston 146 is then moved axially onto the inner annular piston 172, over snap ring 186, O-ring 192, O-ring 188, back up washer 190, and this movement is continued until the snap ring 160 radially expands into its groove 158 formed on the undercut portion 154 of outer annular piston 146. The two pistons 146 and 168 are then sealingly and frictionally engaged to each other and may be placed as a unit in the seal 124.

In the seals of both FIGURES 1 and 2, metal is preferably utilized to form the sealing rings and shaft engaging members although suitable equivalent seal materials such as plastic or the like may be utilized. As has been described, when metal is utilized to form the seal elements, a small amount of fluid leaks radially outwardly between the sealing surfaces to lubricate the sealing surfaces during rotation of the shaft relative to the housing.

Figure 3:
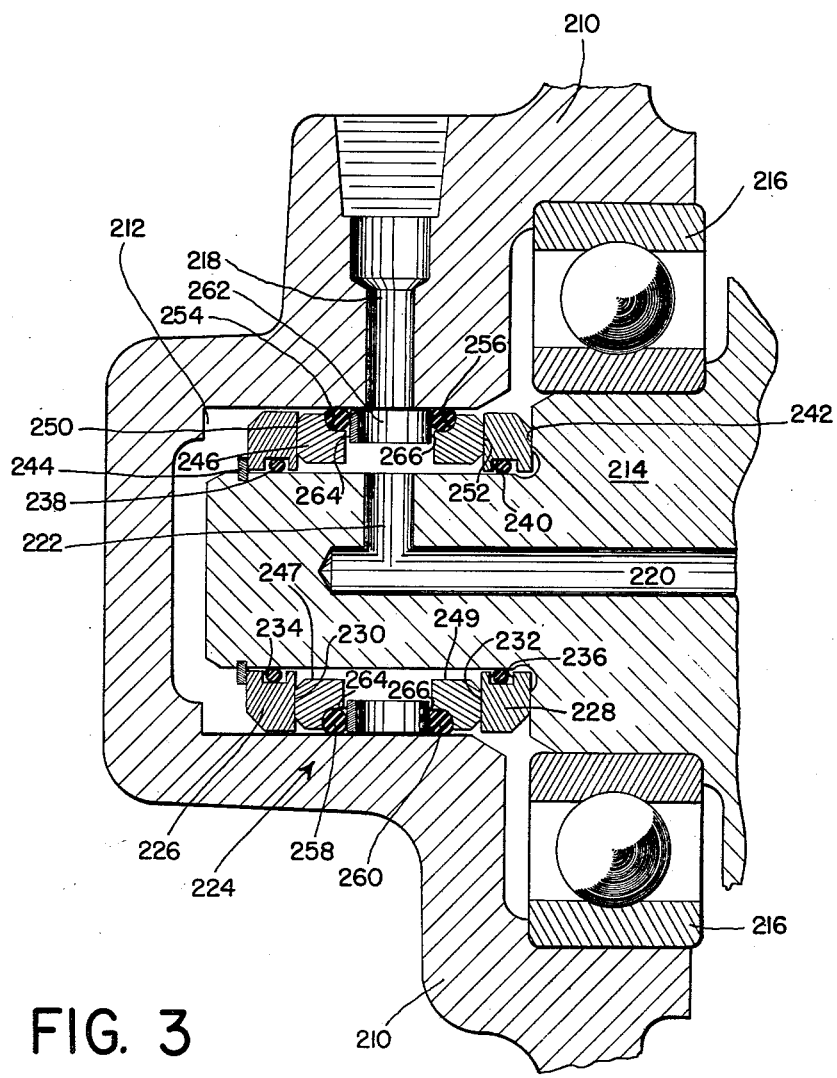
FIGURE 3 is a sectional view of still another embodiment of a high pressure seal.

FIGURE 3 shows a shaft seal which does not have the telescoping piston arrangement of FIGURES 1 and 2 but which, rather, utilizes self lubricating material to inhibit seal wearing high pressures and operating speeds. In FIGURE 3, a housing 210 has a cylindrical chamber 212 formed therein. A shaft 214 is rotatably supported by a bearing assembly 216 in coaxial relation to chamber 212 for rotation relative to housing 210. A fluid passage 218 formed in housing 210 communicates with chamber 212. A fluid passage 220 having a radially extending portion 222 is formed in shaft 214 with the radially extending portion 222 communicating with chamber 212. A seal assembly 224 is provided to permit fluid communication from passage 218 into passage 220 but to prevent leakage of fluid along shaft 214 beyond the seal 224.

Sealing surface members 226 and 228 are disposed within chamber 212 in axially spaced relation on shaft 214. The sealing surface member 226 has a polished planar surface 230 formed thereon. Sealing surface member 228 has a polished planar surface 232 formed thereon. The annular sealing surface members 226 and 228 are disposed in axially spaced relation on shaft 214 with their respective polished planar surfaces 230 and 232 facing each other. The sealing surface member 226 has a groove 234 formed in its internal cylindrical surface. Sealing surface member 228 has a groove 236 formed in its cylindrical internal cylindrical surface. O-rings 238 and 240 respectively are disposed within grooves 234 and 236 to provide static seal means sealing the respective sealing surface members 226 and 228 to shaft 214 and frictionally engaging the sealing surface members 226 and 228 to shaft 214 so that the sealing surface members 226 and 228 are nonrotatable relative to shaft 214 under normal seal operating conditions.

A shoulder 242 formed on shaft 214 serves as a stop means to prevent axial movement of sealing surface member 228 away from sealing surface member 226. A snap ring 244 secured to shaft 214 serves as a stop means to prevent axial movement of sealing surface member 226 axially away from sealing surface member 228.

A seal ring 246 having a cylindrical internal surface 247 is disposed within shaft member 212 adjacent sealing surface member 226. A seal ring 248 having a cylindrical internal surface 249 is disposed within chamber 212 adjacent to sealing surface member 228. Seal ring 246 has a polished planar sealing surface 250 formed thereon. Seal ring 248 has a polished planar surface 252 formed thereon. The polished planar surface 250 of seal ring 246 is in abutting relation to the polished planar surface 230 of sealing surface member 226. The polished planar surface 252 of seal ring 248 is in abutting relation with the polished planar surface 232 of sealing surface member 228.

The seal ring 246 has an annular recess 254 formed adjacent its periphery. The seal ring 248 has an annular recess 256 formed adjacent its periphery. An O-ring 258 is disposed within recess 254 in seal ring 246. An O-ring 260 is disposed within the recess 256 in seal ring 248. O-ring 258 and 260 provide a static seal means between the respective seal rings 246 and 248 and the internal cylindrical surface of chamber 212. When the seal is assembled, the passage 218 opens into chamber 212 between the O-rings 258 and 260.

An annular spring 262 is disposed between the O-rings 258 and 260. Annular spring 262 is corrugated so that it has a plurality of portions 264 which lie in a plane abutting O-ring 258 and a second plurality of portions 266 which lie in a plane abutting O-ring 260. Fluid may easily pass radially through the corrugated annular spring 262.

The seal rings 246 and 248 of seal 224 are preferably formed of a hardened carbonaceous material such as hardened graphite. Hardened graphite is self-lubricating in addition to being highly wear resistant. The fluid under pressure entering passage 218 acts upon the seal rings 246 and 248 and urges them axially away from each other and into contact with the respective surface sealing members 226 and 228. The force with which the sealing rings are urged against their respective sealing surfaces is a direct function of the fluid pressure within chamber 212 between the seal rings. The force with which the respective sealing surfaces 230 and 250 and the sealing surfaces 232 and 252 contact each other is as great or greater than the pressure of the fluid in passage 218.

The hardened carbonaceous material from which the seal rings 246 and 248 are formed is self-lubricating so that very little wear is caused by the rubbing of rings 246 and 248 on their adjacent sealing surface members 226 and 228. If some small wear does take place, the pressure exerted on the rings 246 and 248 by the fluid from passage 218 maintains them in contact with their respective shaft engaging members so that no leakage occurs through the seal.

It will be noted that the seals of the present invention are easily installed on the shaft without major modifications to the shaft. The seals are each radially compact. In several seals built in accordance with the present invention, the radial dimension of the seals has been one-fourth of an inch or less. These seals are designed to have long life under high pressure conditions that have been detrimental to seal life until this time.

According to the provisions of the patent statute, we have explained the principle, preferred construction and mode of operation of our invention and have illustrated and described what we now consider to represent its best embodiments. However, we desire to have it understood that, within the scope of the appended claims, the invention may be practiced otherwise than specifically illustrated and described.

We claim:

1. In a pressure actuated fluid seal adapted to prevent leakage of fluid between a relatively rotatable shaft and housing, said housing coaxially surrounding said shaft in spaced relation thereto, sealing surface means to provide a pair of axially spaced planar polished surfaces sealingly connected to said shaft in nonrotatable relation thereto, the improvement comprising a pair of telescoping annular pistons disposed between said planar polished surfaces, at least one of said annular pistons being sealingly and nonrotatably engaged to said housing, fluid passage means to conduct fluid under pressure between said annular pistons to urge them axially apart and into abutting contact with said respective planar polished surfaces, said pistons constructed and arranged so that the force per unit area of contact of each of said pistons with its respective shaft planar polished surface is less than the pressure of said fluid.

2. In a pressure actuated fluid seal adapted to prevent leakage of fluid between a relatively rotatable shaft and housing, said housing coaxially surrounding said shaft in spaced relation thereto, first and second shaft sealing surface members sealingly and nonrotatably secured to said shaft in axially spaced relation to each other, each of said shaft sealing surface members having a radially extending planar polished surface facing toward the other of said shaft sealing surface members, a first annular piston maintained in nonrotatable static sealing relation to said housing and having a radially extending, planar polished surface axially abutting said first shaft sealing surface member planar surface, a second annular piston maintained in nonrotatable static sealing relation to said first annular piston and having a radially extending, planar polished surface axially abutting said second shaft sealing surface member planar surface, and means to conduct fluid under pressure between said first and second annular pistons to urge said pistons axially into abutting relation with said respective shaft sealing surface members, the net unbalanced area of each of said annular pistons acted upon by said fluid under pressure to urge said piston axially against said respective shaft sealing surface member being less than the annular area of contact between each of said annular piston planar polished surfaces and said respective abutting shaft sealing surface member planar polished surfaces.

3. In a pressure actuated fluid seal adapted to prevent leakage of fluid between a relatively rotatable shaft and housing, said housing coaxially surrounding said shaft in spaced relation thereto, first and second shaft sealing surface members disposed about said shaft in axially spaced relation to each other, first and second stop means associated with said shaft to limit axial movement of said shaft sealing surface members away from each other, first static seal means adapted to nonrotatably and sealingly engage said first shaft sealing surface member to said shaft, second static seal means adapted to nonrotatably and sealingly engage said second shaft sealing surface member to said shaft, each of said shaft sealing surface members having a radially extending, planar polished surface facing toward the other of said shaft sealing surface members, the improvement comprising, a first annular piston maintained in nonrotatable static sealing relation to said housing and having a radially extending, planar polished surface axially abutting said first shaft sealing surface member planar surface, a second annular piston maintained in nonrotatable static sealing relation to said first annular piston and having a radially extending, planar polished surface axially abutting said second shaft sealing surface member planar surface, and means to conduct fluid under pressure between said first and second annular pistons to urge said pistons axially apart into abutting relation with said respective shaft sealing surface members, the net unbalanced area of each of said pistons acted upon by said fluid under pressure to urge said piston axially against said respective shaft sealing surface member being less than the annular area of contact between each of said piston planar polished surfaces and said respective abutting shaft sealing surface member planar polished surfaces.

4. In a pressure actuated fluid seal adapted to provide continuous fluid communication between a first fluid passage in a fixed housing and a second fluid passage in a relatively rotatable shaft, said housing coaxially surrounding said shaft in spaced relation to said shaft to form a cylindrical chamber between said housing and said shaft, first and second shaft sealing surface members sealingly and nonrotatably secured to said shaft in axially spaced relation to each other, each of said shaft sealing surface members having a radially extending, planar polished surface facing toward the other of said shaft sealing surface members, the improvement comprising an outer annular piston maintained within said cylindrical chamber in nonrotatable, static sealing relation to said housing and having a radially extending, planar polished surface axially abutting said first shaft sealing surface member planar surface, an inner annular piston maintained within said cylindrical chamber in nonrotatable static sealing relation to said outer annular piston and having a radially extending planar polished surface axially abutting said second shaft sealing surface member planar surface, said first fluid passage communicating with said cylindrical chamber between said outer and inner piston polished surfaces, said second fluid passage communicating with said cylindrical chamber between said outer and inner piston planar polished surfaces, pressurized fluid arranged to be conducted through said first and second fluid passages to enter said cylindrical chamber between said outer and inner piston planar polished surfaces, at least one of said pistons having radial passages formed therein to permit passage of said fluid into said cylindrical chamber between said pistons, said outer annular piston having a net unbalanced area exposed to said fluid causing said fluid to urge said outer annular piston axially against said first shaft sealing surface member, said inner annular piston having a net unbalanced area exposed to said fluid causing said fluid to urge said inner annular piston axially against said second shaft sealing surface member, said piston net unbalanced areas exposed to said fluid being less than the annular area of contact between said outer annular piston and said first shaft sealing surface member planar polished surfaces and less than the annular area of contact between said inner annular piston and said second shaft sealing surface member planar polished surfaces, the force per unit area of contact between said annular areas of contact thereby being less than the pressure of said fluid.

5. In a pressure actuated fluid seal adapted to prevent leakage of fluid between a relatively rotatable shaft and housing, said housing coaxially surrounding said shaft in spaced relation thereto, first and second shaft sealing surface members disposed about said shaft in axially spaced relation to each other, first and second stop means associated with said shaft to limit axial movement of said shaft sealing surface members away from each other, first static seal means adapted to nonrotatably and sealingly engage said first shaft sealing surface member to said shaft, second static seal means adapted to nonrotatably and sealingly engage said second shaft sealing surface member to said shaft, each of said shaft sealing surface members having a radially extending, planar polished surface facing toward the other of said shaft sealing surface members, the improvement comprising an outer annular piston having a generally cylindrical body portion and a sealing face end portion, said outer piston sealing face end portion having a radially extending planar polished surface formed thereon and disposed to axially abut said first shaft sealing surface member planar polished surface, the external surface of said outer piston body portion having first and second annular grooves formed therein to receive third and fourth static seal means respectively, said third and fourth static seal means adapted to nonrotatably and sealingly engage said outer piston to said housing, the internal surface of said outer piston body portion having a third annular groove formed therein to receive a fifth static seal means, an inner annular piston having a generally cylindrical body portion and a sealing face end portion, said inner piston sealing face end portion having a radially extending planar polished surface formed thereon and disposed to axially abut said second shaft sealing surface member planar polished surface, said inner piston having an axially extending flange portion disposed coaxially within said outer piston cylindrical body portion, said fifth static seal means adapted to nonrotatably and sealingly engage said outer piston to said inner piston flange portion, and means to conduct fluid under pressure between said outer and inner annular pistons to urge said pistons axially into abutting relation with said respective shaft sealing surface members, the net unbalanced area of each of said pistons acted upon by said fluid under pressure to urge said piston axially against said respective shaft sealing surface member being less than the annular area of contact between each of said piston planar polished surfaces and said respective abutting shaft sealing surface member planar polished surfaces.

6. In a pressure actuated fluid seal adapted to prevent leakage of fluid between a relatively rotatable shaft and housing, said housing coaxially surrounding said shaft in spaced relation thereto, first and second shaft sealing surface members disposed about said shaft in axially spaced relation to each other, first and second stop means associated with said shaft to limit axial movement of said shaft sealing surface members away from each other, first static seal means adapted to nonrotatably and sealingly engage said first shaft sealing surface member to said shaft, second static seal means adapted to nonrotatably and sealingly engage said second shaft sealing surface member to said shaft, each of said shaft sealing surface members having a radially extending, planar polished surface facing toward the other of said shaft sealing surface members, the improvement comprising an outer annular piston having a generally cylindrical body portion and a sealing face end portion, said outer piston sealing face end portion having a radially extending planar polished surface formed thereon and disposed to axially abut said first shaft sealing surface member planar polished surface, the external surface of said outer piston body portion being sealingly and frictionally engaged to said housing, the internal surface of said outer piston having a third stop means engageable thereto, an inner annular piston having a generally cylindrical body portion and a sealing face end portion, said inner piston sealing face end portion having a radially extending planar polished surface formed thereon and disposed to axially abut said second shaft sealing surface member planar polished surface, said inner piston body portion disposed in spaced relation coaxially within said outer piston body portion, the external surface of said inner piston body portion having a fourth stop means engageable thereto, third static seal means disposed radially between said outer and inner pistons and adapted to nonrotatably and sealingly engage said pistons to each other, said third static seal means being disposed axially between said third and fourth stop means, and means to conduct fluid under pressure between said outer and inner pistons to urge said rings axially into abutting relation with said respective shaft sealing surface members, the net unbalanced area of each of said pistons acted upon by said fluid under pressure to urge said pistons axially against said respective shaft sealing surface members being less than the annular area of contact between each of said piston planar polished surfaces and said respective abutting shaft sealing surface member planar polished surfaces.

References Cited in the file of this patent

UNITED STATES PATENTS

| | | |
|---|---|---|
| 811,833 | Emmet | Feb. 6, 1906 |
| 2,505,968 | Jack | May 2, 1950 |
| 2,777,702 | Rodal | Jan. 15, 1957 |
| 2,859,054 | Willi | Nov. 4, 1958 |
| 2,990,202 | Dennison | June 27, 1961 |
| 3,021,146 | Sommer et al. | Feb. 13, 1962 |
| 3,039,778 | Sence | June 19, 1962 |